United States Patent
Li

(10) Patent No.: US 12,022,449 B2
(45) Date of Patent: Jun. 25, 2024

(54) DATA TRANSMISSION METHOD AND APPARATUS

(71) Applicant: Huawei Technologies Co., Ltd., Shenzhen (CN)

(72) Inventor: Yanchun Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 591 days.

(21) Appl. No.: 17/192,121

(22) Filed: Mar. 4, 2021

(65) Prior Publication Data

US 2021/0195591 A1   Jun. 24, 2021

Related U.S. Application Data

(63) Continuation of application No. PCT/CN2019/099483, filed on Aug. 6, 2019.

(30) Foreign Application Priority Data

Sep. 4, 2018   (CN) .......................... 201811027726.9

(51) Int. Cl.
  *H04W 72/0453*     (2023.01)
(52) U.S. Cl.
  CPC ................. *H04W 72/0453* (2013.01)
(58) Field of Classification Search
  None
  See application file for complete search history.

(56) References Cited

U.S. PATENT DOCUMENTS

| | | | |
|---|---|---|---|
| 8,437,440 B1 | 5/2013 | Zhang et al. | |
| 9,351,333 B1 | 5/2016 | Zhang et al. | |
| 10,856,244 B2 * | 12/2020 | Verma | ..................... H04L 69/28 |
| 2017/0006608 A1 | 1/2017 | Josiam et al. | |
| 2017/0238286 A1 | 8/2017 | Chun et al. | |

(Continued)

FOREIGN PATENT DOCUMENTS

| | | |
|---|---|---|
| CN | 105120520 A | 12/2015 |
| CN | 106487737 A | 3/2017 |

(Continued)

OTHER PUBLICATIONS

IEEE Std 802.11-2016 (Revision of IEEE Std 802.11-2016), "Part 11: Wireless LAN Medium Access Control (MAC) and Physical Layer (PHY) Specifications," IEEE Computer Society, Sponsored by the LAN/MAN Standards Committee, 2016, 3534 pages.

*Primary Examiner* — Phirin Sam
(74) *Attorney, Agent, or Firm* — Conley Rose, P.C.

(57) ABSTRACT

A data transmission method includes that a first device sends a physical layer protocol data unit (PPDU) to a second device. A bandwidth of channels occupied by the PPDU is N×20 megahertz (MHz), the PPDU includes a preamble sequence having a backward compatibility function and a first extremely high throughput long training field (EHT-LTF), the first EHT-LTF is carried in a first subcarrier set, the first subcarrier set includes one or more subcarriers other than a subcarrier that carries the preamble sequence having the backward compatibility function and a direct current subcarrier in the N 20 MHz channels, and N is a positive integer greater than or equal to 2. The second device receives the PPDU sent by the first device.

20 Claims, 11 Drawing Sheets

(56) References Cited

U.S. PATENT DOCUMENTS

| | | | |
|---|---|---|---|
| 2017/0303280 A1* | 10/2017 | Chun | H04L 27/2603 |
| 2018/0048503 A1* | 2/2018 | Kim | H04L 27/2605 |
| 2018/0184408 A1 | 6/2018 | Xue et al. | |
| 2020/0076552 A1* | 3/2020 | Cherian | H04L 5/0007 |
| 2022/0246598 A1 | 8/2022 | Chen et al. | |

FOREIGN PATENT DOCUMENTS

| | | | |
|---|---|---|---|
| CN | 106664165 A | 5/2017 | |
| CN | 107529354 A | 12/2017 | |
| CN | 107736072 A | 2/2018 | |

\* cited by examiner

| L-STF (20 MHz) | L-LTF | L-SIG | | | |
|---|---|---|---|---|---|
| | | EHT-LTF 0 | EHT-SIG-A (40 MHz) | EHT-SIG-B (40 MHz) | EHT-Data (40 MHz) |
| L-STF (20 MHz) | L-LTF | L-SIG | | | |

FIG. 3

| | | EHT-LTF 0 | | | |
|---|---|---|---|---|---|
| L-STF (20 MHz) | L-LTF | L-SIG | | | |
| | | EHT-LTF 0 | EHT-SIG-A (40 MHz) | EHT-SIG-B (40 MHz) | EHT-Data (40 MHz) |
| L-STF (20 MHz) | L-LTF | L-SIG | | | |
| | | EHT-LTF 0 | | | |

FIG. 4

| | | EHT-LTF 0 | EHT-LTF 1 | | | |
|---|---|---|---|---|---|---|
| L-STF (20 MHz) | L-LTF | L-SIG | RL-SIG | EHT-SIG-A (40 MHz) | EHT-SIG-B (40 MHz) | EHT-Data (40 MHz) |
| | | EHT-LTF 0 | EHT-LTF 1 | | | |
| L-STF (20 MHz) | L-LTF | L-SIG | RL-SIG | | | |
| | | EHT-LTF 0 | EHT-LTF 1 | | | |

FIG. 5

| | | | EHT-LTF 0 | | |
|---|---|---|---|---|---|
| L-STF (20 MHz) | L-LTF | L-SIG | EHT-SIG-A | EHT-SIG-B (40 MHz) | EHT-Data (40 MHz) |
| | | | EHT-LTF 0 | | |
| L-STF (20 MHz) | L-LTF | L-SIG | EHT-SIG-A | | |
| | | | EHT-LTF 0 | | |

| EHT-SIG-A (Information about a quantity of RUs) | EHT-SIG-B (Information about a quantity of RUs) | EHT-SIG-B STA 1, RU 1 (A quantity of remaining RUs is 1) | EHT-SIG-B STA 1, RU 2 (A quantity of remaining RUs is 0) |

FIG. 8

| PSDU 1 | PSDU 4 | PSDU 7 |

| PSDU 2 | PSDU 3 | PSDU 5 | PSDU 6 | PSDU 8 |

FIG. 9

| PSDU 2 | PSDU 5 | PSDU 7 |

| PSDU 1 | PSDU 3 | PSDU 4 | PSDU 6 | PSDU 8 |

DATA TRANSMISSION METHOD AND APPARATUS

CROSS-REFERENCE TO RELATED APPLICATIONS

This application is a continuation of International Patent Application No. PCT/CN2019/099483 filed on Aug. 6, 2019, which claims priority to Chinese Patent Application No. 201811027726.9 filed on Sep. 4, 2018. The disclosures of the aforementioned applications are hereby incorporated by reference in their entireties.

TECHNICAL FIELD

This application relates to the communications field, and in particular, to a data transmission method and an apparatus.

BACKGROUND

A wireless local area network (WLAN) standard includes gradually evolved versions, for example, 802.11n, 802.11ac, and 802.11ax. A granularity of a channel for transmitting a physical layer protocol data unit (PPDU) in 802.11n, 802.11ac, and 802.11ax is 20 megahertz (MHz). When a bandwidth (for example, 280 MHz or 320 MHz) of channels is relatively high, the PPDU may be repeatedly sent in an entire bandwidth for a relatively large quantity of times by using 20 MHz as a basic granularity of the channel. In this case, a spectrum is fragmented, and channel utilization is relatively low.

SUMMARY

This application provides a data transmission method and apparatus, to improve channel utilization by increasing a granularity of a channel for transmitting a PPDU.

According to a first aspect, a data transmission method is provided. The method includes that a first device generates a PPDU. A bandwidth of channels occupied by the PPDU is N*20 MHz, the PPDU includes a preamble sequence having a backward compatibility function and a first extremely high throughput long training field (EHT-LTF), the first EHT-LTF is carried in a first subcarrier set, the first subcarrier set includes one or more subcarriers other than a subcarrier that carries the preamble sequence having the backward compatibility function in the N 20 MHz channels, and N is a positive integer greater than or equal to 2. The first device sends the PPDU to a second device.

In some possible implementations, N is 2.

In some possible implementations, the first EHT-LTF is used by the second device to perform format identification and channel estimation on the PPDU.

According to the data transmission method in this embodiment of this application, a granularity of a channel for transmitting a PPDU is increased, to help reduce spectrum fragmentation caused by an excessively small granularity of the channel, thereby helping improve channel utilization.

With reference to the first aspect, in some possible implementations of the first aspect, the first subcarrier set includes one or more subcarriers other than a direct current subcarrier and the subcarrier used to carry the preamble sequence having the backward compatibility function in the N 20 MHz channels.

According to the data transmission method in this embodiment of this application, a subcarrier in the N 20 MHz channels and subcarriers at two ends of the N 20 MHz channels are used to send the EHT-LTF. This helps improve channel utilization and improve reliability of PPDU format detection by a receive end.

With reference to the first aspect, in some possible implementations of the first aspect, the first subcarrier set includes one or more subcarriers other than a direct current subcarrier and the subcarrier used to carry the preamble sequence having the backward compatibility function in every two of the N 20 MHz channels.

According to the data transmission method in this embodiment of this application, some subcarriers in the N 20 MHz channels are used to send the EHT-LTF. This helps improve channel utilization and improve reliability of PPDU format detection by a receive end.

With reference to the first aspect, in some possible implementations of the first aspect, the PPDU further includes an extremely high throughput signal field (EHT-SIG) field, the preamble sequence having the backward compatibility function includes a legacy signal field L-SIG having the backward compatibility function, the L-SIG is located in a first time unit, and the EHT-SIG is located in a second time unit. The first EHT-LTF is located in the first time unit, the first EHT-LTF is located in the second time unit, or the first EHT-LTF is located in a time unit between the first time unit and the second time unit.

With reference to the first aspect, in some possible implementations of the first aspect, a rate field in the L-SIG indicates that a transmission rate of the PPDU is a first transmission rate, and the first transmission rate is used by the second device to identify a format of the PPDU.

In some possible implementations, the first transmission rate is not 6 megabits per second (Mb/s).

With reference to the first aspect, in some possible implementations of the first aspect, data in the PPDU is carried on at least one resource unit. The EHT-SIG is used to indicate a quantity of the at least one resource unit, or the EHT-SIG is used to indicate a quantity of remaining resource units in the at least one resource unit.

According to the data transmission method in this embodiment of this application, information about a quantity of resource units is carried in a signal sequence, or a quantity of current remaining resource units in a PPDU is carried in a signal sequence. This helps a receive end determine whether information is missing, thereby preventing the receive end from missing information related to the receive end.

With reference to the first aspect, in some possible implementations of the first aspect, the data includes at least one physical layer service data unit (PSDU), and the at least one PSDU is carried on the at least one resource unit according to a predefined rule.

According to the data transmission method in this embodiment of this application, a transmit end may control a transmission sequence of a data packet. This helps improve user experience. When the data packet is filled in a stipulated manner, a transmission delay of the data packet is reduced.

With reference to the first aspect, in some possible implementations of the first aspect, the PPDU further includes a redundant L-SIG (RL-SIG) field, the RL-SIG is located in a third time unit, and the third time unit is the $1^{st}$ time unit after the first time unit.

With reference to the first aspect, in some possible implementations of the first aspect, the PPDU further includes an extremely high throughput short training field (EHT-STF) and a second EHT-LTF.

In some possible implementations, the second EHT-LTF is used for channel estimation.

In some possible implementations, when a spatial transmission configuration of a next PPDU remains unchanged and there is one spatial stream, the PPDU does not include the EHT-STF and the second EHT-LTF.

According to a second aspect, a data transmission method is provided. The method includes that a second device receives a PPDU sent by a first device. A bandwidth of channels occupied by the PPDU is N*20 MHz, the PPDU includes a preamble sequence having a backward compatibility function and a first EHT-LTF, the first EHT-LTF is carried in a first subcarrier set, the first subcarrier set includes one or more subcarriers other than a subcarrier that carries the preamble sequence having the backward compatibility function in the N 20 MHz channels, and N is a positive integer greater than or equal to 2.

With reference to the second aspect, in some possible implementations of the second aspect, the first subcarrier set includes one or more subcarriers other than a direct current subcarrier and the subcarrier used to carry the preamble sequence having the backward compatibility function in the N 20 MHz channels.

With reference to the second aspect, in some possible implementations of the second aspect, the first subcarrier set includes one or more subcarriers other than a direct current subcarrier and the subcarrier used to carry the preamble sequence having the backward compatibility function in every two of the N 20 MHz channels.

With reference to the second aspect, in some possible implementations of the second aspect, the PPDU further includes an EHT-SIG, the preamble sequence having the backward compatibility function includes an L-SIG having the backward compatibility function, the L-SIG is located in a first time unit, and the EHT-SIG is located in a second time unit. The first EHT-LTF is located in the first time unit, the first EHT-LTF is located in the second time unit, or the first EHT-LTF is located in a time unit between the first time unit and the second time unit.

With reference to the second aspect, in some possible implementations of the second aspect, a rate field in the L-SIG indicates that a transmission rate of the PPDU is a first transmission rate, and the first transmission rate is used by the second device to identify a format of the PPDU.

With reference to the second aspect, in some possible implementations of the second aspect, data in the PPDU is carried on at least one resource unit. The EHT-SIG is used to indicate a quantity of the at least one resource unit, or the EHT-SIG is used to indicate a quantity of remaining resource units in the at least one resource unit.

With reference to the second aspect, in some possible implementations of the second aspect, the data includes at least one PSDU, and the at least one PSDU is carried on the at least one resource unit according to a predefined rule.

With reference to the second aspect, in some possible implementations of the second aspect, the PPDU further includes an RL-SIG, the RL-SIG is located in a third time unit, and the third time unit is the $1^{st}$ time unit after the first time unit.

With reference to the second aspect, in some possible implementations of the second aspect, the PPDU further includes an EHT-STF and a second EHT-LTF.

In this embodiment of this application, a receiver of the PPDU and a transmitter of the PPDU may interact with each other before the PPDU is sent, to indicate to support or enable communication based on a format of the PPDU.

According to a third aspect, this application provides a data transmission apparatus. The apparatus may be a network device, a terminal device, a chip in a network device, or a chip in a terminal device. The data transmission apparatus has functions of implementing various embodiments of the first aspect. The functions may be implemented by hardware, or may be implemented by hardware executing corresponding software. The hardware or the software includes one or more modules corresponding to the functions.

In a possible design, when the data transmission apparatus is a network device or a terminal device, the network device or the terminal device includes a processing module and a transceiver module. The processing module may be, for example, a processor. The transceiver module may be, for example, a transceiver, and the transceiver includes a radio frequency circuit. Optionally, the network device or the terminal device further includes a storage module, and the storage module may be, for example, a memory. When the network device or the terminal device includes a storage module, the storage module is configured to store a computer executable instruction, the processing module is connected to the storage module, and the processing module executes the computer executable instruction stored in the storage module, to enable the network device or the terminal device to perform the data transmission method according to any one of the implementations of the first aspect.

In another possible design, when the apparatus is a chip in a network device or a chip in a terminal device, the chip includes a processing module and a transceiver module. The processing module may be, for example, a processor, and the transceiver module may be, for example, an input/output interface, a pin, or a circuit on the chip. The processing module may execute a computer executable instruction stored in a storage module, to enable the chip in the network device or terminal device to perform the data transmission method according to any one of the implementations of the first aspect. Optionally, the storage module is a storage unit inside the chip, for example, a register or a cache, or the storage module may be a storage module that is outside the chip and that is in the network device or terminal device, for example, a read-only memory (ROM), a static storage device of another type that may store static information and an instruction, or a random-access memory (RAM).

The processor mentioned in any of the foregoing designs may be a general-purpose central processing unit (CPU), a microprocessor, an application-specific integrated circuit (ASIC), or one or more integrated circuits configured to control program execution of the data transmission method according to the first aspect.

According to a fourth aspect, this application provides a data transmission apparatus. The apparatus may be a network device, a terminal device, a chip in a network device, or a chip in a terminal device. The data transmission apparatus has functions of implementing various embodiments of the second aspect. The functions may be implemented by hardware, or may be implemented by hardware executing corresponding software. The hardware or the software includes one or more modules corresponding to the functions.

In a possible design, when the data transmission apparatus is a network device or a terminal device, the network device or the terminal device includes a processing module and a transceiver module. The processing module may be, for example, a processor. The transceiver module may be, for example, a transceiver, and the transceiver includes a radio frequency circuit. Optionally, the network device or the terminal device further includes a storage module, and the storage module may be, for example, a memory. When the network device or the terminal device includes a storage module, the storage module is configured to store a computer executable instruction, the processing module is connected to the storage module, and the processing module executes the computer executable instruction stored in the storage module, to enable the network device or the terminal device to perform the data transmission method according to any one of the implementations of the second aspect.

In another possible design, when the apparatus is a chip in a network device or a chip in a terminal device, the chip includes a processing module and a transceiver module. The processing module may be, for example, a processor, and the transceiver module may be, for example, an input/output interface, a pin, or a circuit on the chip. The processing module may execute a computer executable instruction stored in a storage unit, to enable the chip in the network device or terminal device to perform the data transmission method according to any one of the implementations of the second aspect. Optionally, the storage module is a storage module inside the chip, for example, a register or a cache, or the storage module may be a storage module that is outside the chip and that is in the network device or terminal device, for example, a ROM, a static storage device of another type that may store static information and an instruction, or a RAM.

The processor mentioned in any of the foregoing designs may be a general-purpose CPU, a microprocessor, an ASIC, or one or more integrated circuits configured to control program execution of the data transmission method according to the second aspect.

According to a fifth aspect, a computer storage medium is provided. The computer storage medium stores program code, and the program code is used to indicate an instruction for performing the method according to any one of the first aspect, the second aspect, the possible implementations of the first aspect, or the possible implementations of the second aspect.

According to a sixth aspect, a computer program product including an instruction is provided. When the computer program product is run on a computer, the computer is enabled to perform the method according to any one of the first aspect, the second aspect, the possible implementations of the first aspect, or the possible implementations of the second aspect.

BRIEF DESCRIPTION OF DRAWINGS

FIG. 3 is a schematic diagram of a PPDU according to an embodiment of this application;

FIG. 4 is another schematic diagram of a PPDU according to an embodiment of this application;

FIG. 5 is another schematic diagram of a PPDU according to an embodiment of this application;

FIG. 6 is another schematic diagram of a PPDU according to an embodiment of this application;

FIG. 7 is another schematic diagram of a PPDU according to an embodiment of this application;

FIG. 8 is a schematic diagram of an EHT-SIG-A and an EHT-SIG-B in a PPDU according to an embodiment of this application;

FIG. 9 is a schematic diagram of a PSDU filling manner according to an embodiment of this application;

FIG. 10 is a schematic diagram of another PSDU filling manner according to an embodiment of this application;

FIG. 13 is another schematic diagram of a PPDU according to an embodiment of this application;

DESCRIPTION OF EMBODIMENTS

Figure 1:
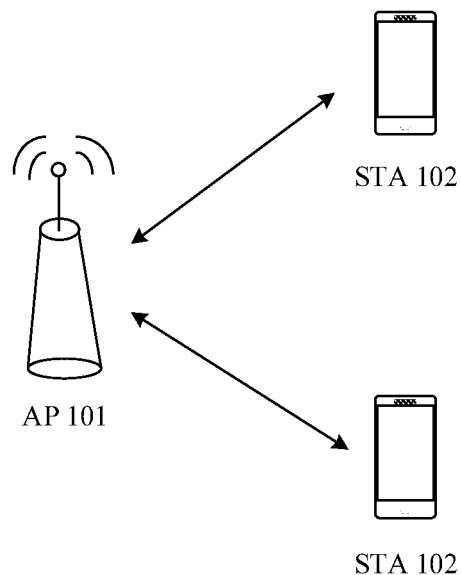
FIG. 1 is a schematic diagram of a network architecture of a WLAN according to an embodiment of this application.

The following describes technical solutions of this application with reference to the accompanying drawings.

The technical solutions of embodiments of this application may be applied to various communications systems, such as a Global System for Mobile Communications (GSM) system, a code-division multiple access (CDMA) system, a wideband CDMA (WCDMA) system, a General Packet Radio Service (GPRS), a Long-Term Evolution (LTE) system, an LTE frequency division duplex (FDD) system, an LTE time division duplex (TDD) system, a Universal Mobile Telecommunications System (UMTS), a Worldwide Interoperability for Microwave Access (WIMAX) communications system, a 5th generation (5G) system, or a New Radio (NR) system.

A first device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The first device may alternatively be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application. For convenience of description, a station (STA) is used as an example for description in the following embodiments.

The first device in the embodiments of this application may alternatively be a base transceiver station (BTS) in a GSM or a CDMA system, a NodeB (NB) in a WCDMA system, an evolved NodeB (eNB or eNodeB) in an LTE system, or a radio controller in a scenario of a cloud radio access network (CRAN). Alternatively, the second device may be a relay node, an access point, a vehicle-mounted device, a wearable device, a network device in a 5G network, a network device in a future evolved PLMN network, an access point (AP), a personal basic service set control point, or the like. This is not limited in the embodiments of this application. For convenience of description, an AP is used as an example for description in the following embodiments.

The second device in the embodiments of this application may be a STA or an AP.

In the embodiments of this application, the station or the access point includes a hardware layer, an operating system layer running on the hardware layer, and an application layer running on the operating system layer. The hardware layer includes hardware such as a CPU, a memory management unit (MMU), and a memory (which is also referred to as a main memory). The operating system may be any one or more computer operating systems that implement service processing through a process, for example, a LINUX operating system, a UNIX operating system, an ANDROID operating system, an IOS operating system, or a WINDOWS operating system. The application layer includes applications such as a browser, an address book, word processing software, and instant communications software. In addition, a specific structure of an execution body of a method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the STA or AP, or a function module that can invoke and execute the program in the STA or AP.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable ROM (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry an instruction and/or data.

FIG. 1 is a schematic diagram of a network architecture of a WLAN according to an embodiment of this application. As shown in FIG. 1, the network architecture of the WLAN includes an AP 101 and at least one STA 102. The AP 101 communicates with the at least one STA 102 in a wireless manner.

Figure 2:
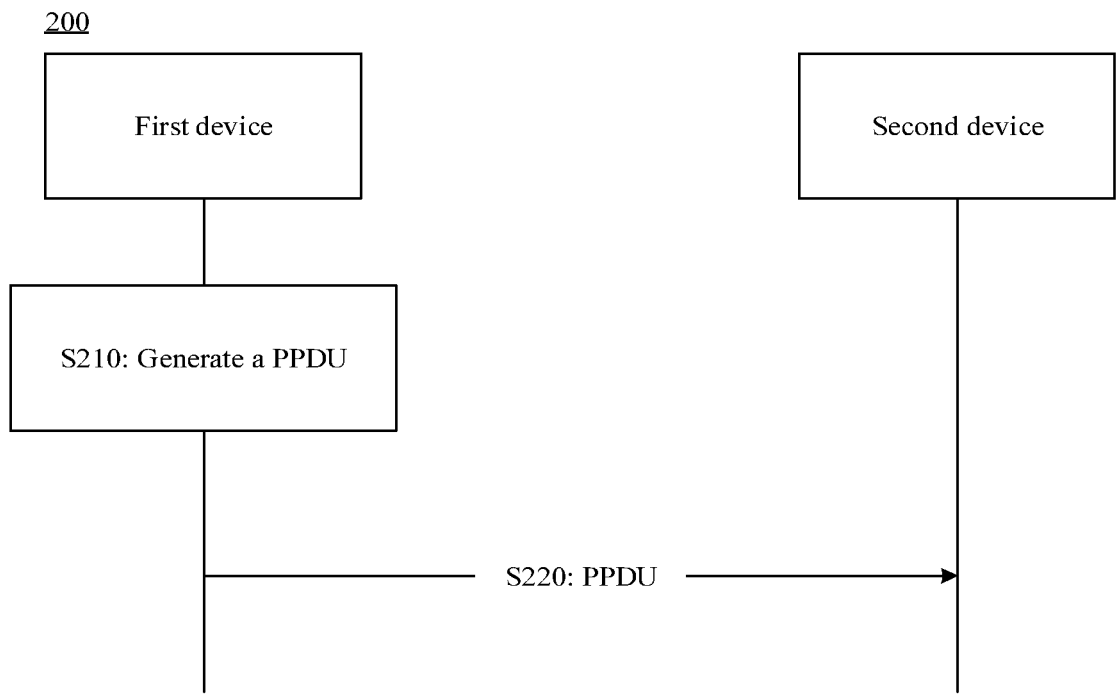
FIG. 2 is a schematic flowchart of a data transmission method according to an embodiment of this application.

FIG. 2 is a schematic flowchart of a data transmission method 200 according to an embodiment of this application. As shown in FIG. 2, the method 200 includes the following steps.

S210: A first device generates a PPDU. The PPDU occupies N 20 MHz channels, the PPDU includes a preamble sequence having a backward compatibility function and a first EHT-LTF, the first EHT-LTF is carried in a first subcarrier set, the first subcarrier set includes one or more subcarriers other than a subcarrier that carries the preamble sequence having the backward compatibility function in the N 20 MHz channels, and N is a positive integer greater than or equal to 2.

It should be understood that the first device may be the AP 101 shown in FIG. 1.

Optionally, the preamble sequence having the backward compatibility function includes a legacy short training field (L-STF) having the backward compatibility function, a legacy long training field (L-LTF) having the backward compatibility function, and an L-SIG having the backward compatibility function.

Further, the preamble sequence having the backward compatibility function includes an L-STF repeated for a plurality of periodicities of 0.8 microseconds (µs) in time domain (where for example, a length of the L-STF is 0.8 µs×10 when there are 10 periodicities), and includes an L-LTF stipulated in a standard. The L-LTF may be used for channel estimation. The L-SIG includes a rate field and a length field (a quantity of bytes in a PSDU), and duration of a part after the legacy preamble may be calculated by using the indicated rate field and length field, or duration of the entire PPDU may be obtained by adding a time length of the preamble sequence. Compatibility of a sequence having the foregoing structure can be maintained, and good spectrum coexistence can be implemented with a compatible station. Therefore, the compatible station needs to be capable of identifying a PPDU length.

Optionally, the rate field in the L-SIG indicates that a transmission rate of the PPDU is a first transmission rate, and the first transmission rate is used to indicate a format of the PPDU to a second device.

It should be understood that, if the PPDU is a PPDU in a stipulated format, the rate field in the L-SIG indicates that the transmission rate of the PPDU is the first transmission rate, and the rate field is filled with a stipulated value. After receiving the PPDU, a receive end may determine the format of the PPDU based on the rate field.

It should be further understood that, that the rate field indicates that the transmission rate of the PPDU is the first transmission rate may be a behavior of a transmitter stipulated in a protocol.

Optionally, the first transmission rate is not 6 Mb/s.

Further, when the second device receives the L-SIG and learns, through parsing, that the first transmission rate indicated by the rate field in the L-SIG is not 6 Mb/s, the second device may determine that the PPDU is not a high throughput (HT) PPDU, a very high throughput (VHT) PPDU, or a high efficiency (HE) PPDU.

It should be understood that, in the embodiments of this application, the HT PPDU may also be referred to as an 802.11n PPDU, the VHT PPDU may also be referred to as an 802.11ac PPDU, and the HE PPDU may also be referred to as an 802.11ax PPDU.

Optionally, the EHT-SIG includes one or more of the following information: a characteristic sequence stipulated in an EHT protocol, a bandwidth of the PPDU, an indication of a target STA of the PPDU (an application identifier (AID) of a measurement user of the second device), a format of the PPDU (for example, a single-user PPDU or a multi-user PPDU), an identifier (ID) (for example, a basic service set (BSS) ID or a BSS color) of a BSS to which the PPDU belongs, remaining occupation time (network allocation vector (NAV) time) of a transmission opportunity (TXOP) to which the PPDU belongs, and transmit power of the PPDU.

Optionally, the first EHT-LTF is used by the second device to perform format identification and channel estimation on the PPDU.

Optionally, the first EHT-LTF is carried in the first subcarrier set. The first subcarrier set includes one or more subcarriers other than a direct current subcarrier and the subcarrier used to carry the preamble sequence having the backward compatibility function in the N 20 MHz channels.

For example, when N is 2, the PPDU occupies 40 MHz (higher 20 MHz and lower 20 MHz), and the first subcarrier set includes one or more of a subcarrier in a channel of higher 20 MHz and a channel of lower 20 MHz, a subcarrier in an upper end of higher 20 MHz, and a subcarrier in a lower end of lower 20 MHz.

Optionally, the first subcarrier set includes one or more subcarriers other than a direct current subcarrier and the subcarrier used to carry the preamble sequence having the backward compatibility function in every two of the N 20 MHz channels.

For example, when N is 2, the PPDU occupies 40 MHz (higher 20 MHz and lower 20 MHz), and the first subcarrier set includes one or more subcarriers in a channel of higher 20 MHz and a channel of lower 20 MHz.

Optionally, the L-SIG is located in a first time unit, the PPDU further includes an EHT-SIG, and the EHT-SIG is located in a second time unit, where the first EHT-LTF is located in the first time unit, the first EHT-LTF is located in the second time unit, or the first EHT-LTF is located between the first time unit and the second time unit.

In this embodiment of this application, the time unit may be a radio frame, subframe, slot, mini-slot, or orthogonal frequency division multiplexing (OFDM) symbol defined in an LTE or 5G NR system, or may be a time window including a plurality of frames or subframes, for example, a system information (SI) window.

The format of the PPDU in this embodiment of this application is described below by using N=2. It should be understood that this embodiment of this application is applicable to a case in which a bandwidth of channels occupied by a PPDU is 40 MHz or higher or a case in which a bandwidth of channels occupied by a PPDU is 40 MHz×N (where N=1, 2, 3 . . . ).

It may be understood that this embodiment of this application may also be naturally extended to a case in which a basic granularity of an occupied bandwidth is 60 MHz or 80 MHz, and correspondingly, unused subcarriers in three 20 MHz channels in 60 MHz are used, but is not limited to a case of 40 MHz in the following example.

FIG. 3 is a schematic diagram of a PPDU according to an embodiment of this application. As shown in FIG. 3, a column direction represents a frequency domain resource. When OFDM modulation is used, the frequency domain resource is a subcarrier resource.

The PPDU includes a preamble sequence having a backward compatibility function. Because the entire PPDU occupies a 40 MHz channel, the preamble sequence having the backward compatibility function in a 20 MHz channel is moved upward and downward by 32 subcarrier spacings (that is, subcarriers frequency offsets are marked as +32 and −32 shown in Table 1). In this way, the preamble sequences having the backward compatibility function that are copied in frequency domain are respectively located in a channel of higher 20 MHz of 40 MHz and a channel of lower 20 MHz of 40 MHz.

It should be further understood that a PPDU with a basic granularity of 40 MHz includes a preamble sequence having a backward compatibility function, and 64-point inverse fast Fourier transform (IFFT) processing is used in every 20 MHz. Subcarriers on which 64-point IFFT processing has not been performed are marked, in ascending order of frequencies, as −31, −30, . . . , 0, 1, 2, . . . , 32 or as [−31, 32] in this embodiment of this application. During implementation, the subcarriers may alternatively be marked as [−32, 31], [0, 63], or [1, 64]. This does not affect the essence of this embodiment of this application. A subcarrier spacing is 20 MHz/64. For ease of description, the subcarriers are marked as [−31, 32] in this embodiment of this application.

Direct current subcarriers: [−31, −27] in higher 20 MHz and [27, 32] in lower 20 MHz between subcarriers of two L-SIG on an L-SIG symbol are unused. It may be stipulated in a protocol that one or more subcarriers at the center of the entire 40 MHz are used as one or more direct current subcarriers (DC tones). As shown in Table 1, the subcarriers numbered [31, 32] in lower 20 MHz and the subcarrier numbered −31 in higher 20 MHz are used as direct current subcarriers.

EHT-LTF 0 subcarrier: A subcarrier other than a subcarrier carrying the L-SIG and the direct current subcarrier is used as an EHT-LTF 0 subcarrier. The EHT-LTF 0 subcarrier is used to send a fixed sequence stipulated in a protocol. As shown in Table 1, the subcarriers numbered [27, 30] in lower 20 MHz and the subcarriers numbered [−27, −30] in higher 20 MHz are used as EHT-LTF 0 subcarriers. The EHT-LTF 0 subcarrier may be used for PPDU version detection (or referred to as autodetection). The EHT-LTF 0 subcarrier is a known sent signal, and may also be used as a reference signal to provide channel estimation.

It should be understood that the EHT-LTF 0 may correspond to the first EHT-LTF in the foregoing method 200.

Table 1 is an illustration of a time-frequency resource in which an L-SIG and an EHT-LTF 0 in the PPDU shown in FIG. 3 are located.

TABLE 1

| | Subcarrier index | Subcarrier frequency offset | Content carried on a subcarrier | 11ax | EHT-LTF 0 (Sequence 1) | EHT-LTF 0 (Sequence 2) | EHT-LTF 0 (Sequence 3) |
|---|---|---|---|---|---|---|---|
| Higher 20 MHz | [−26, 26] | +32 | L-SIG | | | | |
| | −27 | | Extra Tones | −1 | 1 | 1 | 1 |
| | −28 | | | −1 | −1 | −1 | −1 |
| | −29 | | | | 1 | 1 | 1 |
| | −30 | | | | 1 | −1 | −1 |
| | −31 | | DC Tones | | | | |
| Lower 20 | [31, 32] | −32 | DC Tones | | | | |
| | 30 | | Extra | | 1 | −1 | 1 |

TABLE 1-continued

| | Subcarrier index | Subcarrier frequency offset | Content carried on a subcarrier | 11ax | EHT-LTF 0 (Sequence 1) | EHT-LTF 0 (Sequence 2) | EHT-LTF 0 (Sequence 3) |
|---|---|---|---|---|---|---|---|
| MHz | 29 | | Tones | | 1 | 1 | 1 |
| | 28 | | | 1 | −1 | −1 | −1 |
| | 27 | | | −1 | −1 | −1 | −1 |
| | [−26, 26] | | L-SIG | | | | |

FIG. 4 is another schematic diagram of a PPDU according to an embodiment of this application. As shown in FIG. 4, compared with the PPDU in FIG. 3, the PPDU shown in FIG. 4 not only uses unused subcarriers in the middle of two 20 MHz channels, but also uses an unused subcarrier at in upper end of higher upper 20 MHz and an unused subcarrier in a lower end of lower 20 MHz.

Table 2 is an illustration of a time-frequency resource in which an L-SIG and an EHT-LTF 0 in the PPDU shown in FIG. 4 are located. Different from Table 1, the PPDU further uses subcarriers [27, 28] in higher 20 MHz and subcarriers [−27, −28] in lower 20 MHz.

TABLE 2

| | Subcarrier index | Subcarrier frequency offset | Content carried on a subcarrier | 11ax | EHT-LTF 0 (Sequence 1) | EHT-LTF 0 (Sequence 2) | EHT-LTF 0 (Sequence 3) |
|---|---|---|---|---|---|---|---|
| Higher 20 MHz | 28 | +32 | Extra Tones | 1 | −1 | −1 | −1 |
| | 27 | | | −1 | −1 | −1 | −1 |
| | [−26, 26] | | L-SIG | | | | |
| | −27 | | Extra Tones | −1 | 1 | 1 | 1 |
| | −28 | | | −1 | −1 | −1 | −1 |
| | −29 | | | | 1 | −1 | 1 |
| | −30 | | | | 1 | −1 | −1 |
| | −31 | | DC Tones | | | | |
| Lower 20 MHz | [31, 32] | −32 | DC Tones | | | | |
| | 30 | | Extra Tones | | 1 | −1 | 1 |
| | 29 | | | | 1 | 1 | 1 |
| | 28 | | | 1 | −1 | −1 | −1 |
| | 27 | | | −1 | −1 | −1 | −1 |
| | [−26, 26] | | L-SIG | | | | |
| | −27 | | Extra Tones | −1 | 1 | 1 | 1 |
| | −28 | | | −1 | −1 | −1 | −1 |

Optionally, the PPDU further includes an RL-SIG, the RL-SIG occupies a third time unit, and the third time unit is the $1^{st}$ time unit after the first time unit.

FIG. 5 is another schematic diagram of a PPDU according to an embodiment of this application. As shown in FIG. 5, the first device may send an RL-SIG in a third time unit ($1^{st}$ time unit after an L-SIG). The RL-SIG may be a repeated L-SIG, and may also be referred to as a redundant L-SIG. The RL-SIG may be a copied L-SIG symbol, or the RL-SIG is on a subcarrier carrying the L-SIG in an L-SIG symbol. The RL-SIG may use information interleaved by a specified interleaver, for example, information about a predetermined quantity of offset subcarriers. Alternatively, content on a high-frequency subcarrier and content on a low-frequency subcarrier is exchanged, or content on a subcarrier in higher 10 MHz of 20 MHz and content on a subcarrier in lower 10 MHz of 20 MHz is exchanged.

EHT-LTF 1 in the third time unit: In the $1^{st}$ time unit after the L-SIG, an EHT-LTF 1 is transmitted on a subcarrier on which an EHT-LTF 0 is located, and the EHT-LTF 1 and the EHT-LTF 0 use a same sequence or different sequences.

Because the EHT-LTF 1 and the EHT-LTF 0 may use a stipulated characteristic sequence, a transmitter uses 12×2 resource elements (RE) to carry the EHT-LTF 1 and the EHT-LTF 0, to provide a robust version indication and a channel estimation parameter.

It should be understood that, in this embodiment of this application, as shown in FIG. 5, the RL-SIG and the EHT-LTF 1 may be sent in the $1^{st}$ time unit after the L-SIG. Alternatively, as shown in FIG. 4, an EHT-SIG-A may be sent in the 1 time unit after the L-SIG.

It should be further understood that subcarriers carrying the EHT-SIG-A may be the same as subcarriers that carry the preamble sequence having the backward compatibility function and subcarriers carrying the EHT-LTF 0. For example, as shown in Table 2, numbers of the subcarriers that carry the preamble sequence having the backward compatibility function in higher 20 MHz are [−26, 26], and numbers of the subcarriers carrying the EHT-LTF 0 are [−30, −27] and [27, 28]. In this case, numbers of subcarriers carrying the EHT-SIG-A (or an EHT-SIG-B) are [−26, 26], [−30, −27], and [27, 28].

It should be further understood that a generation manner similar to that of the L-SIG is used for the $1^{st}$ symbol after the L-SIG to generate a 20 MHz signal, subcarrier modulation (IFFT transformation) is performed once, and then the signal is moved upward and downward by 10 MHz to obtain a 40 MHz signal. Alternatively, two 20 MHz signals are generated. Each 20 MHz signal includes different content, and is moved upward and downward by 10 MHz to obtain a 40 MHz signal.

Optionally, the PPDU further includes an EHT-STF and an EHT-LTF.

FIG. 6 is another schematic diagram of a PPDU according to an embodiment of this application. As shown in FIG. 6, an EHT-LTF 0 and an EHT-SIG-A in the PPDU occupy a same time unit (a next time unit of a time unit in which an L-SIG is located). Sending of the EHT-LTF 0 is delayed by one time unit in time domain. Compared with FIG. 4, numbers of subcarriers carrying the EHT-LTF 0 may be subcarriers [−30, −27] and [27, 28] in higher 20 MHz and subcarriers [27, 30] and [−28, −27] in lower 20 MHz. Numbers of subcarriers carrying the EHT-SIG-A may be subcarriers [−26, 26] in higher 20 MHz and subcarriers [−26, 26] in lower 20 MHz.

It should be understood that, compared with the PPDU shown in FIG. 4, a quantity of subcarriers for sending the EHT-SIG-A in the PPDU shown in FIG. 6 is reduced.

Figure 7:
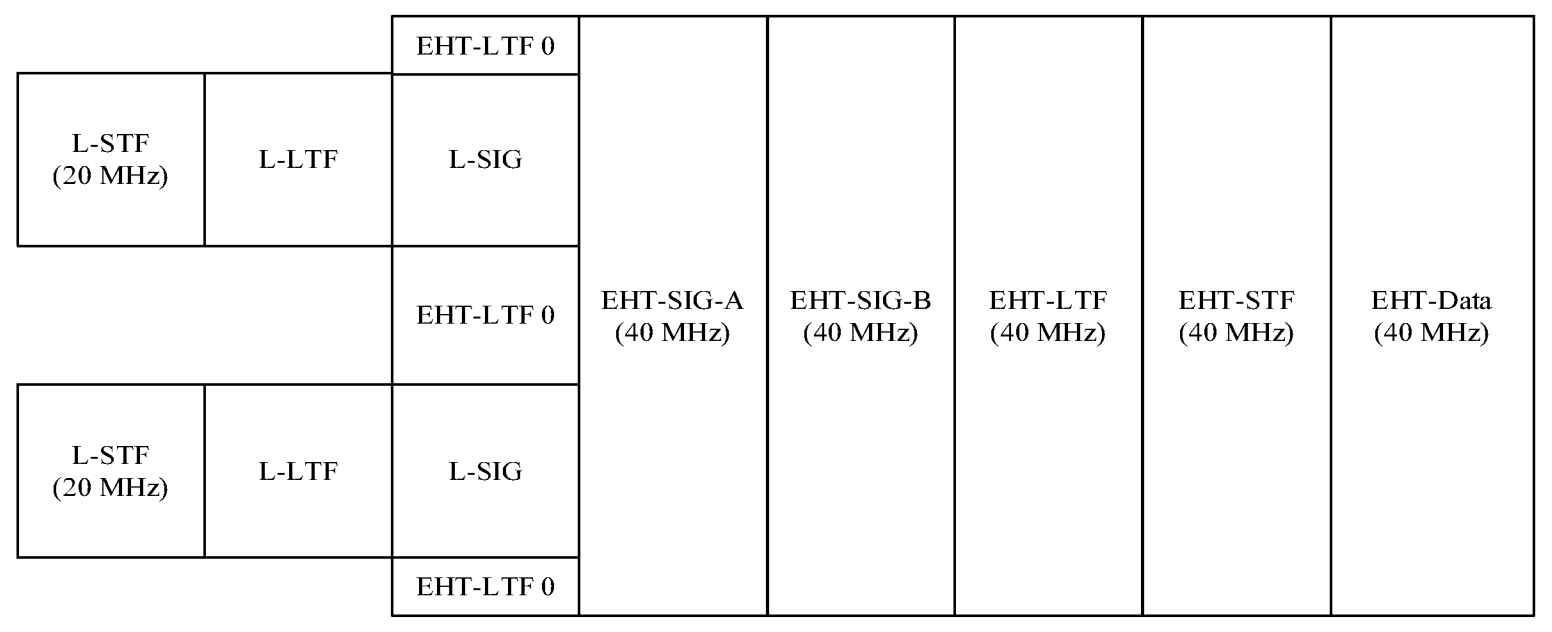

FIG. 7 is another schematic diagram of a PPDU according to an embodiment of this application. As shown in FIG. 7, the PPDU further includes an EHT-STF and a second EHT-LTF.

It should be understood that, in this embodiment of this application, the EHT-STF and the second EHT-LTF in the PPDU are optional, and may or may not exist. If the EHT-STF and the second EHT-LTF exist in the PPDU, the first device may further indicate, to the second device by using indication information, that the PPDU includes the EHT-STF and the second EHT-LTF.

It should be further understood that the second EHT-LTF is used to send a fixed sequence specified in a protocol.

It should be further understood that, in this embodiment of this application, the PPDU may include 1-bit indication information. The 1-bit indication information is used to indicate whether the PPDU includes the EHT-STF and the second EHT-LTF. For example, "0" indicates that the PPDU does not include the EHT-STF and the second EHT-LTF, and "1" indicates that the PPDU includes the EHT-STF and the second EHT-LTF.

Whether the PPDU includes the EHT-STF and the second EHT-LTF may alternatively be indicated in an implicit manner. For example, when a spatial transmission configuration of a next PPDU remains unchanged and there is one spatial stream, the PPDU does not include the EHT-STF and the second EHT-LTF. Alternatively, when a spatial transmission configuration of a next PPDU remains unchanged, there is one spatial stream, and a subcarrier spacing remains unchanged, the PPDU does not include the EHT-STF and the second EHT-LTF.

Optionally, the PPDU further includes data, for example, extremely high throughput data EHT-Data shown in FIG. 3 to FIG. 7. The data is carried on one or more resource units (RUs). An EHT-SIG is used to indicate a quantity of the at least one RU, or an EHT-SIG is used to indicate a quantity of remaining RUs in the at least one RU.

It should be understood that, due to different channel quality or different reliability requirements on the carried data, the at least one RU may use different modulation and coding schemes (MCS). For example, as shown in FIG. 3 or FIG. 4, the EHT-Data on the higher 20 MHz channel is carried on an RU 1, and is transmitted at a rate 1. The EHT-Data on the lower 20 MHz channel is carried on an RU 2, and is transmitted at a rate 2.

FIG. 8 is a schematic diagram of an EHT-SIG-A and an EHT-SIG-B included in the PPDU. The EHT-SIG-A or the EHT-SIG-B may include information about the quantity of the at least one RU, or the EHT-SIG-B includes the quantity of remaining RUs in the at least one RU, so that the receive end can learn of a quantity of RUs allocated to the receive end.

Optionally, the EHT-SIG-A or the EHT-SIG-B may further include description information of each RU in the at least one RU. The description information may be an access category (AC), traffic specific ID, or traffic stream ID of the RU.

According to the data transmission method in this embodiment of this application, information about a quantity of resource units is carried in a signal sequence, or a quantity of signal remaining resource units in a PPDU is carried in a channel sequence. This helps a receive end determine whether information is missing, thereby preventing the receive end from missing information related to the receive end.

Optionally, the data includes at least one PSDU, and the at least one PSDU is carried on the at least one resource unit according to a predefined rule.

Optionally, the first device may determine an RU on which a start moment for filling the PSDU is the earliest (where an end moment for filling a previous PSDU on the RU is the earliest) in the at least one RU.

FIG. 9 is a schematic diagram of a PSDU filling manner. As shown in FIG. 9, a PSDU 1 is filled on an RU 1 and a PSDU 2 is filled on an RU 2 at the same time, and an end moment for filling the PSDU 2 on the RU 2 is earlier than an end moment for filling the PSDU 1 on the RU 1 (where a start moment for filling a PSDU 3 on the RU 2 is alternatively earlier than a start moment for filling the PSDU 3 on the RU 1). In this case, the first device may determine that the PSDU 3 is filled on the RU 2. The end moment for filling the PSDU 1 on the RU 1 is earlier than an end moment for filling the PSDU 3 on the RU 2 (where a start moment for filling a PSDU 4 on the RU 1 is alternatively earlier than a start moment for filling the PSDU 4 on the RU 2). In this case, the first device may determine that the PSDU 4 is filled on the RU 1. By analogy, it may be learned that the PSDU 1, the PSDU 4, and a PSDU 7 are filled on the RU 1, and the PSDU 2, the PSDU 3, a PSDU 5, a PSDU 6, and a PSDU 8 are filled on the RU 2.

Optionally, the first device may determine an RU on which an end moment for filling the PSDU is the latest (where a start moment for filling a next PSDU on the RU is the latest) in the at least one RU.

FIG. 10 is a schematic diagram of another PSDU filling manner. As shown in FIG. 10, a PSDU 2 is filled on an RU 1 and a PSDU 1 is filled on an RU 2 at the same time, and an end moment for filling the PSDU 1 on the RU 2 is earlier than an end moment for filling the PSDU 2 on the RU 1. Because an end moment for filling a PSDU 3 on the RU 2 is earlier than an end moment for filling the PSDU 3 on the RU 1, the first device may determine that the PSDU 3 is filled on the RU 2. By analogy, it may be learned that the PSDU 2, a PSDU 5, and a PSDU 7 are filled on the RU 1, and the PSDU 1, the PSDU 3, a PSDU 4, a PSDU 6, and a PSDU 8 are filled on the RU 2.

Figure 11:
FIG. 11 is a schematic diagram of another PSDU filling manner according to an embodiment of this application.
Figure 11:
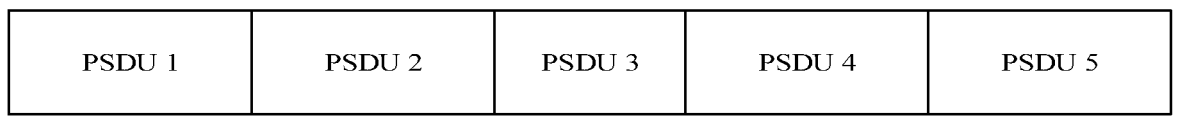

It should be understood that, in the PSDU filling manners shown in FIG. 9 and FIG. 10, a plurality of RUs share packet sequence numbers. FIG. 11 is a schematic diagram of another PSDU filling manner. As shown in FIG. 11, different packet sequence numbers are used in different RUs, and a sequence of sequence numbers is maintained in a single RU.

It should be understood that, in this embodiment of this application, the PSDU filling manner is not limited to the foregoing several filling manners, and may alternatively be another filling manner. This is not limited in this embodiment of this application.

It should be further understood that information indicating a filling manner of the PSDU may be included in the PPDU by the transmit end (the first device), for example, carried in an EHT-SIG and sent to the receive end (the second device).

After receiving the information, the receive end may receive each PSDU in the filling manner. Alternatively, a filling manner of the PSDU may be stipulated upon in advance by the transmit end and the receive end.

According to the data transmission method in this embodiment of this application, the transmit end may control a transmission sequence of a data packet. This helps improve user experience. When the data packet is filled in a stipulated manner, a transmission delay of the data packet is reduced.

It should be understood that, in this embodiment of this application, when the first device uses a plurality of RUs, the plurality of RUs may use different MCSs. Alternatively, when the first device uses a plurality of RUs, the plurality of RUs use a same coding mode, but may use different MCSs.

S220: The first device sends the PPDU to the second device, and the second device receives the PPDU sent by the first device.

After receiving the PPDU, the second device may determine a format of the PPDU.

A manner in which the second device determines the format of the PPDU includes but is not limited to the following several manners.

(1) Channel estimation may be performed in a time unit corresponding to each subcarrier and by using the EHT-LTF 0 stipulated in a protocol. Because adjacent channels have high correlation, for example, correlation between adjacent subcarriers or correlation between a group of adjacent subcarriers may be calculated.

Further, as shown in Table 1 or Table 2, the second device may obtain channel coefficients h(29) and h(30) corresponding to subcarriers numbered 29 and 30 on the lower 20 MHz channel, and may obtain:

$$c(29,30)=(h(29) \times h(30))/(|h(29)| \times |h(30)|).$$

When a correlation value is greater than a preset threshold, it may be considered that there is a high probability that the PPDU is an EHT PPDU.

(2) The second device decodes rate information in the L-SIG. If the rate information is a rate value (for example, greater than 6 Mb/s) predetermined in a protocol, the second device may consider that the PPDU is an EHT PPDU or an 802.11a PPDU.

(3) The $1^{st}$ first time unit after the L-SIG is received. In addition, based on a sending manner that is of the symbol and stipulated in a protocol, subcarriers on which the symbol is located are compared with subcarriers of a symbol on which the L-SIG is located. For example, whether the stipulated sending manner is satisfied or whether the stipulated sending manner matches stipulated interleaving manner is detected.

(4) Subcarriers carrying the EHT-LTF 0 are detected. For example, as shown in Table 2, whether sequences exist on subcarriers numbered [27, 28] in higher 20 MHz and on subcarriers numbered [−27, −28] in lower 20 MHz is detected. If the sequences exist, it may be determined that the PPDU is an EHT PPDU. If the sequences do not exist, it may be considered that the PPDU is an HT/VHT/HE PPDU.

It should be understood that, in this embodiment of this application, the second device may determine a PPDU version in all or some of the foregoing manners. This is not limited in this application.

Optionally, the second device determines a channel estimation value on a corresponding subcarrier based on the EHT-LTF 0 (or the EHT-LTF 0 and the EHT-LTF 1) in the PPDU, where the channel estimation value is used for subsequent equalization and demodulation in a time unit.

Optionally, the second device identifies an upper half part and a lower half part of the EHT-SIG-A based on the EHT-LTF 0 (or the EHT-LTF 0 and the EHT-LTF 1).

As shown in FIG. 4, after receiving the PPDU shown in FIG. 4, the second device may determine a sequence of the EHT-LTF 0 in higher 20 MHz and a sequence of the EHT-LTF 0 in lower 20 MHz. The sequence of the EHT-LTF 0 in higher 20 MHz is different from the sequence of the EHT-LTF 0 in lower 20 MHz. In this case, the second device may determine that an EHT-SIG-A corresponding to the sequence of the EHT-LTF 0 in higher 20 MHz is an upper half part of the EHT-SIG-A, and an EHT-SIG-A corresponding to the sequence of the EHT-LTF 0 in lower 20 MHz is a lower half part of the EHT-SIG-A.

It should be understood that FIG. 4 is merely an example. Actually, subcarriers carrying the EHT-SIG-A are the same as subcarriers carrying the L-SIG and the EHT-LTF 0.

For example, after determining that a sequence on the subcarrier numbered −30 in higher 20 MHz is 1, −1, −1, the second device may determine that a part carrying the EHT-SIG-A (carried by the subcarriers numbered [−30, 28]) in higher 20 MHz is an upper half part of the entire EHT-SIG-A.

For another example, after determining that a sequence on the subcarrier numbered 30 in lower 20 MHz is 1, −1, 1, the second device may determine that a part carrying the EHT-SIG-A (carried by the subcarriers numbered [−28, 30]) in lower 20 MHz is a lower half part of the entire EHT-SIG-A.

Figure 12:
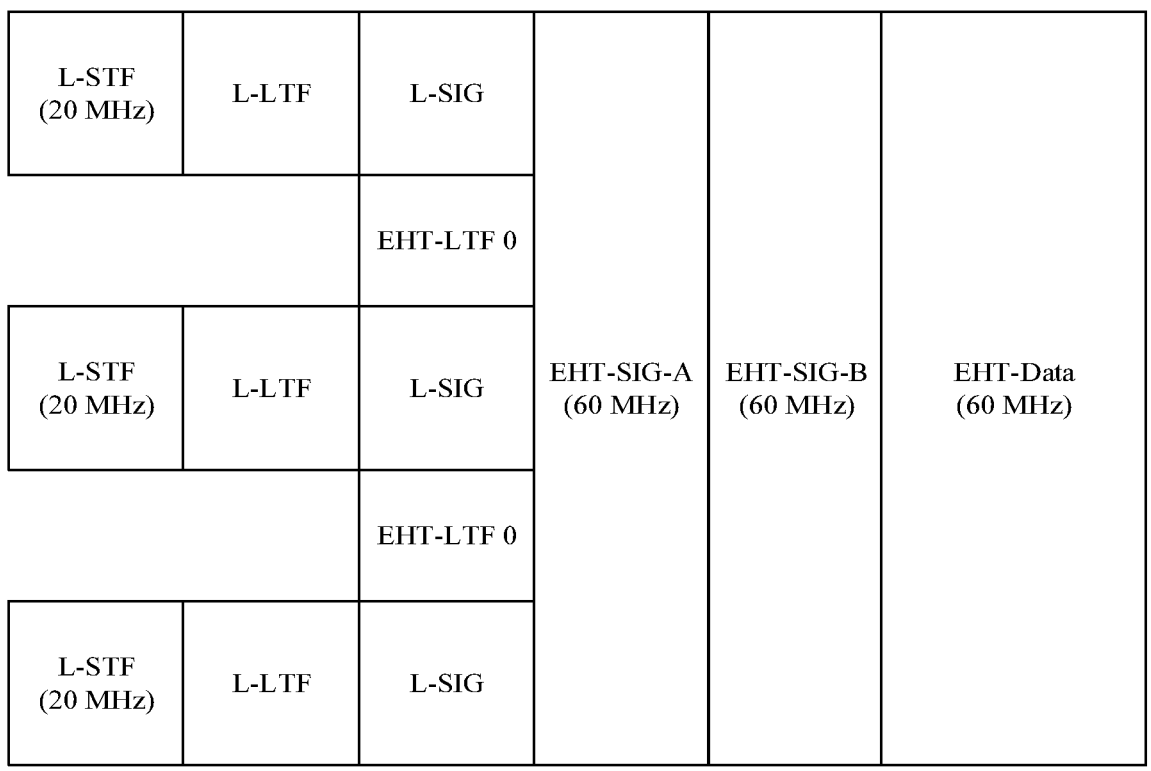
FIG. 12 is another schematic diagram of a PPDU according to an embodiment of this application.

An example in which a granularity of a channel occupied by a PPDU is 40 MHz is used above for description. FIG. 12 is another schematic diagram of a PPDU according to an embodiment of this application. As shown in FIG. 12, the PPDU uses a channel granularity of 60 MHz.

Figure 13:
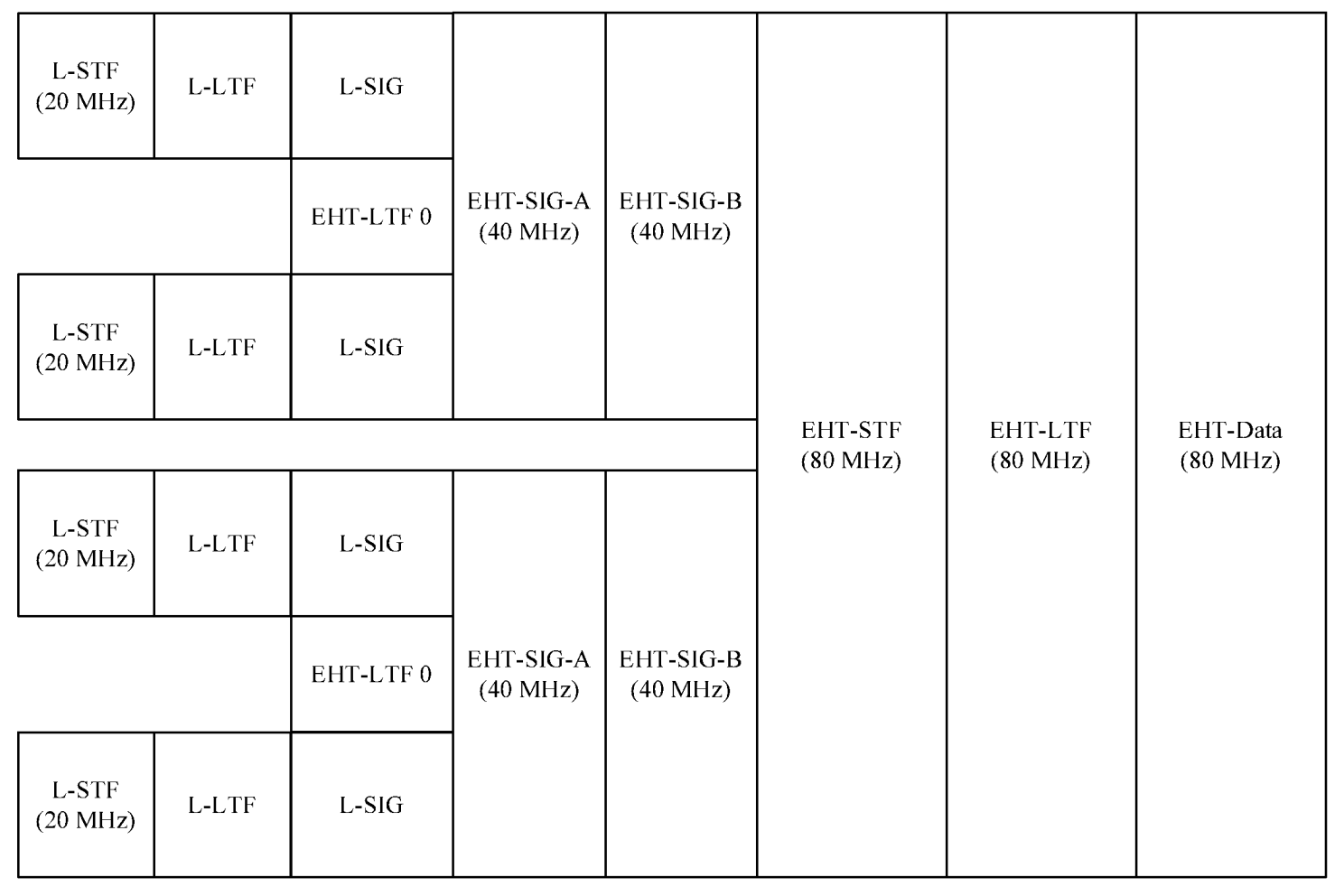
Figure 14:
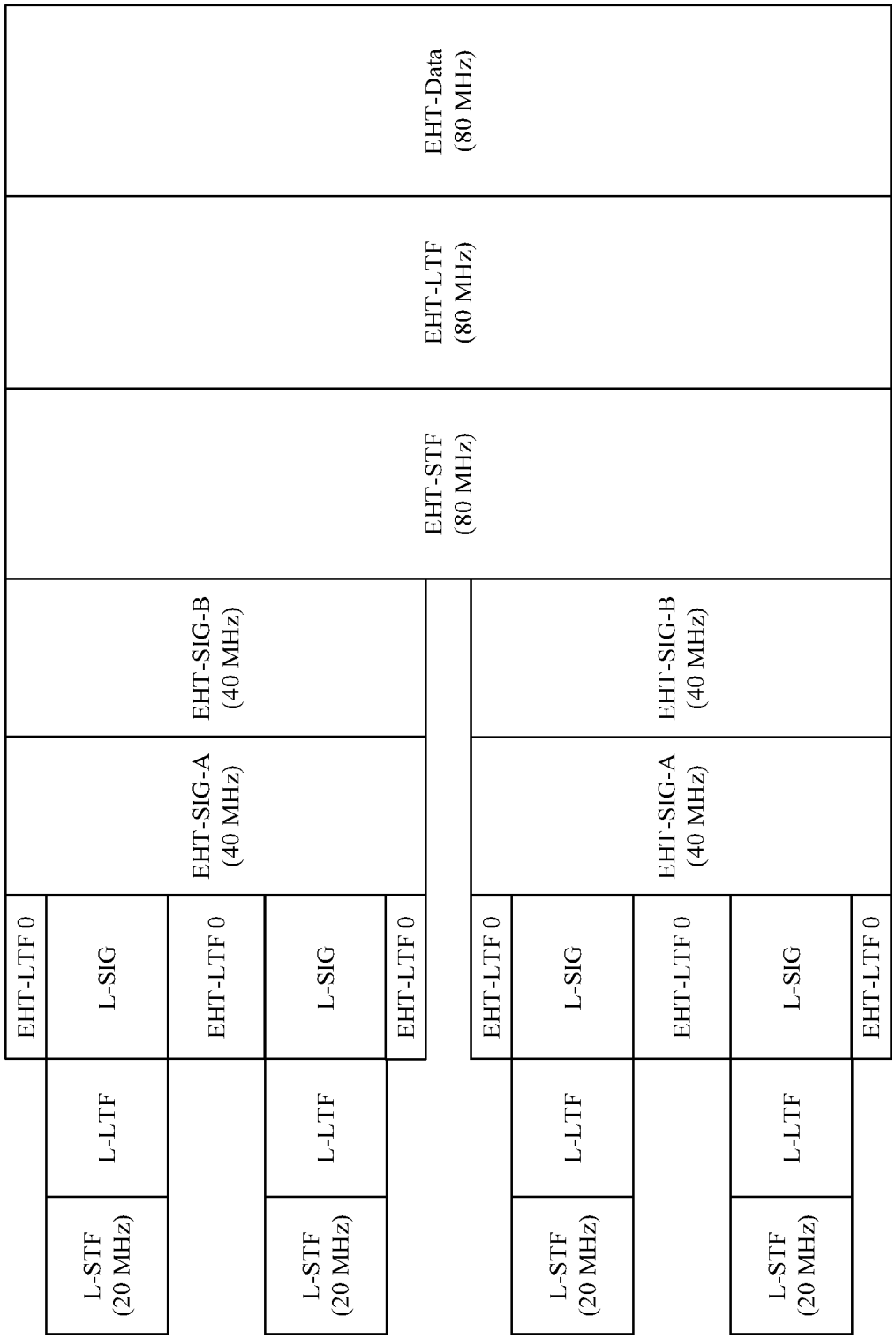
FIG. 14 is another schematic diagram of a PPDU according to an embodiment of this application.

FIG. 13 and FIG. 14 are each another schematic diagram of a PPDU according to an embodiment of this application. The PPDUs shown in FIG. 13 and FIG. 14 use a channel granularity of 80 MHz.

The data transmission method according to the embodiments of this application is described in detail above with reference to FIG. 1 to FIG. 14. A data transmission apparatus according to the embodiments of this application is described in detail below with reference to FIG. 15 and FIG. 18.

Figure 15:
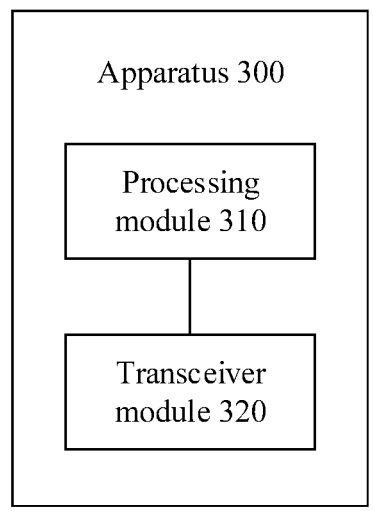
FIG. 15 is a schematic block diagram of a data transmission apparatus according to an embodiment of this application.

FIG. 15 is a schematic block diagram of a data transmission apparatus 300 according to an embodiment of this application. The data transmission apparatus 300 may correspond to the foregoing first device.

It should be understood that the data transmission apparatus 300 may correspond to the first device in the foregoing method embodiments, and may have any function of the first device in the method embodiments.

The data transmission apparatus 300 includes a processing module 310 configured to generate a PPDU, where a bandwidth of channels occupied by the PPDU is N×20 MHz, the PPDU includes a preamble sequence having a backward compatibility function and a first EHT-LTF, the first EHT-LTF is carried in a first subcarrier set, the first subcarrier set includes one or more subcarriers other than a subcarrier that carries the preamble sequence having the backward compatibility function and a direct current subcarrier in the N 20 MHz channels, and N is a positive integer greater than or equal to 2, and a transceiver module 320 configured to send the PPDU to a second device.

Optionally, the first subcarrier set includes one or more subcarriers other than the subcarrier used to carry the preamble sequence having the backward compatibility function and the direct current subcarrier in every two of the N 20 MHz channels.

Optionally, the PPDU further includes an EHT-SIG, the preamble sequence having the backward compatibility function includes an L-SIG having the backward compatibility function, the L-SIG is located in a first time unit, and the EHT-SIG is located in a second time unit, where the first EHT-LTF is located in the first time unit, the first EHT-LTF is located in the second time unit, or the first EHT-LTF is located in a time unit between the first time unit and the second time unit.

Optionally, a rate field in the L-SIG indicates that a transmission rate of the PPDU is a first transmission rate, and the first transmission rate is used by the second device to identify a format of the PPDU.

Optionally, data in the PPDU is carried on at least one resource unit, and the EHT-SIG is used to indicate a quantity of the at least one resource unit, or the EHT-SIG is used to indicate a quantity of remaining resource units in the at least one resource unit.

Optionally, the data includes at least one PSDU, and the at least one PSDU is carried on the at least one resource unit according to a predefined rule.

Optionally, the PPDU further includes an RL-SIG, the RL-SIG is located in a third time unit, and the third time unit is the $1^{st}$ time unit after the first time unit.

Optionally, the PPDU further includes an EHT-STF and a second EHT-LTF.

Optionally, the data transmission apparatus 300 in this embodiment of this application may be a network device or a terminal device, or may be a chip in a network device or terminal device.

It should be understood that the data transmission apparatus 300 according to this embodiment of this application may correspond to the first device in the foregoing method embodiments, and the foregoing and other management operations and/or functions of the modules in the data transmission apparatus 300 are used to implement corresponding steps of the foregoing methods. For brevity, details are not described herein again.

Figure 16:
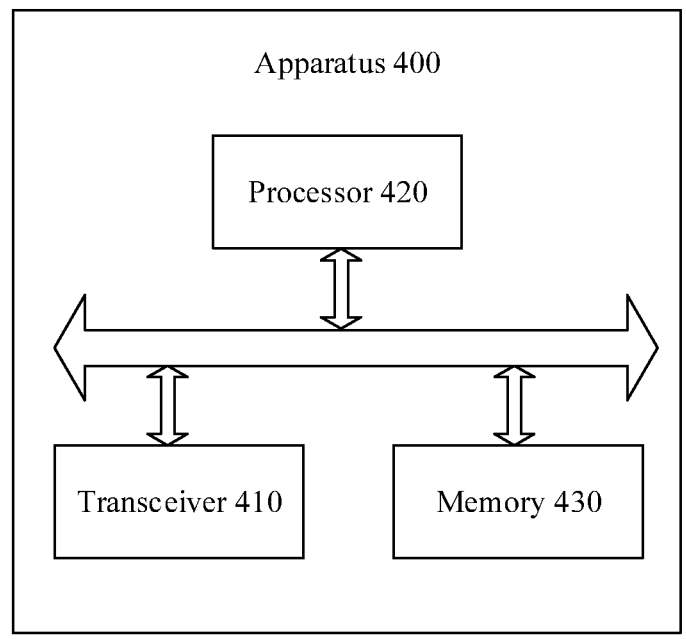
FIG. 16 is another schematic block diagram of a data transmission apparatus according to an embodiment of this application.

Optionally, if the data transmission apparatus 300 is a network device or a terminal device, the transceiver module 320 in this embodiment of this application may be implemented by a transceiver 410, and the processing module 310 may be implemented by a processor 420. As shown in FIG. 16, a data transmission apparatus 400 may include a transceiver 410, a processor 420, and a memory 430. The memory 430 may be configured to store indication information, and may be configured to store code, an instruction, and the like that are to be executed by the processor 420. The transceiver 410 may include a radio frequency circuit. Optionally, the network device or the terminal device further includes a storage unit.

The storage unit may be, for example, a memory. When the network device or the terminal device includes a storage unit, the storage unit is configured to store a computer executable instruction. A processing unit is connected to the storage unit, and the processing unit executes the computer executable instruction stored in the storage unit, to enable the network device or the terminal device to perform the foregoing data transmission method.

Optionally, if the data transmission apparatus 300 is a chip in a network device or terminal device, the chip includes a processing module 310 and a transceiver module 320. The transceiver module 320 may be implemented by the transceiver 410, and the processing module 310 may be implemented by the processor 420. The transceiver module may be, for example, an input/output interface, a pin, or a circuit. The processing module can execute a computer executable instruction stored in a storage unit. The storage unit is a storage unit in the chip, for example, a register or a cache, or the storage unit may be a storage unit located outside the chip in the terminal device, for example, a ROM or another type of static storage device capable of storing static information and instructions, or a RAM.

Figure 17:
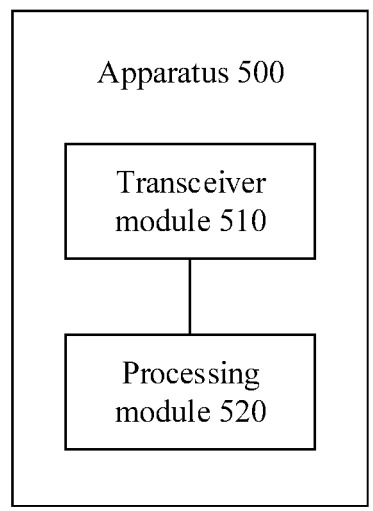
FIG. 17 is another schematic block diagram of a data transmission apparatus according to an embodiment of this application.

FIG. 17 is a schematic block diagram of a data transmission apparatus 500 according to an embodiment of this application. The data transmission apparatus 500 may correspond to the foregoing second device.

It should be understood that the data transmission apparatus 500 may correspond to the second device in the foregoing method embodiments, and may have any function of the second device in the method embodiments.

The data transmission apparatus 500 includes a transceiver module 510 configured to receive a PPDU sent by a first device, where a bandwidth of channels occupied by the PPDU is N×20 MHz, the PPDU includes a preamble sequence having a backward compatibility function and a first EHT-LTF, the first EHT-LTF is carried in a first subcarrier set, the first subcarrier set includes one or more subcarriers other than a subcarrier that carries the preamble sequence having the backward compatibility function and a direct current subcarrier in the N 20 MHz channels, and N is a positive integer greater than or equal to 2, and a processing module 520 configured to determine the PPDU.

Optionally, the first subcarrier set includes one or more subcarriers other than the subcarrier used to carry the preamble sequence having the backward compatibility function and the direct current subcarrier in every two of the N 20 MHz channels.

Optionally, the PPDU further includes an EHT-SIG, the preamble sequence having the backward compatibility function includes an L-SIG having the backward compatibility function, the L-SIG is located in a first time unit, and the EHT-SIG is located in a second time unit, where the first EHT-LTF is located in the first time unit, the first EHT-LTF is located in the second time unit, or the first EHT-LTF is located in a time unit between the first time unit and the second time unit.

Optionally, a rate field in the L-SIG indicates that a transmission rate of the PPDU is a first transmission rate, and the first transmission rate is used by the second device to identify a format of the PPDU.

Optionally, data in the PPDU is carried on at least one resource unit, and the EHT-SIG is used to indicate a quantity of the at least one resource unit, or the EHT-SIG is used to indicate a quantity of remaining resource units in the at least one resource unit.

Optionally, the data includes at least one PSDU, and the at least one PSDU is carried on the at least one resource unit according to a predefined rule.

Optionally, the PPDU further includes an RL-SIG, the RL-SIG is located in a third time unit, and the third time unit is the $1^{st}$ time unit after the first time unit.

Optionally, the PPDU further includes an EHT-STF and a second EHT-LTF.

It should be understood that the data transmission apparatus 500 according to this embodiment of this application may correspond to the second device in the foregoing method embodiments, and the foregoing and other management operations and/or functions of the modules in the data transmission apparatus 500 are used to implement corresponding steps of the foregoing methods. For brevity, details are not described herein again.

Figure 18:
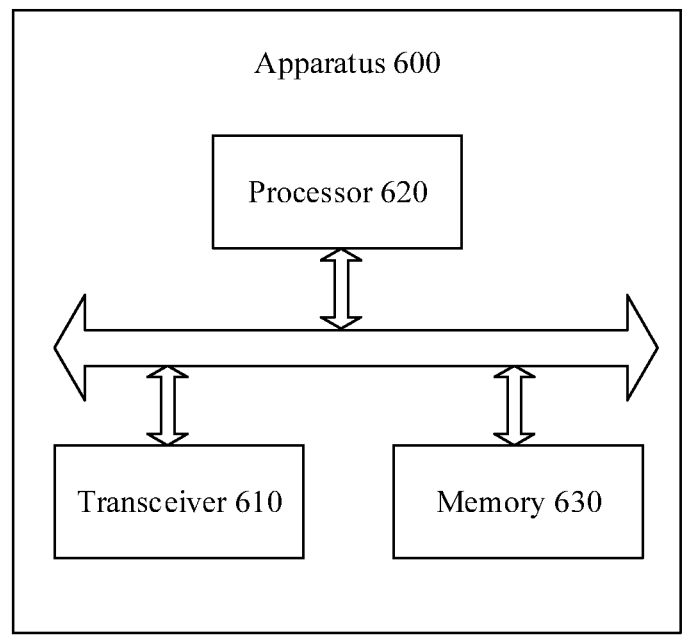
FIG. 18 is another schematic block diagram of a data transmission apparatus according to an embodiment of this application.

Optionally, if the data transmission apparatus 500 is a network device or a terminal device, the transceiver module 510 in this embodiment of this application may be implemented by a transceiver 610, and the processing module 520 may be implemented by a processor 620. As shown in FIG. 18, a data transmission apparatus 600 may include a transceiver 610, a processor 620, and a memory 630. The memory 630 may be configured to store indication information, and may be configured to store code, an instruction, and the like that are to be executed by the processor 620. The transceiver 610 may include a radio frequency circuit. Optionally, the network device or the terminal device further includes a storage unit.

The storage unit may be, for example, a memory. When the network device or the terminal device includes a storage unit, the storage unit is configured to store a computer executable instruction. A processing unit is connected to the storage unit, and the processing unit executes the computer executable instruction stored in the storage unit, to enable the network device or the terminal device to perform the foregoing data transmission method.

Optionally, if the data transmission apparatus 500 is a chip in a network device or terminal device, the chip includes a processing module 510 and a transceiver module 520. The transceiver module 510 may be implemented by the transceiver 610, and the processing module 520 may be implemented by the processor 620. The transceiver module may be, for example, an input/output interface, a pin, or a circuit. The processing module can execute a computer executable instruction stored in a storage unit. The storage unit is a storage unit inside the chip, for example, a register or a cache, or the storage unit may be a storage unit that is outside the chip and that is in the terminal device, for example, a ROM, a static storage device of another type that may store static information and an instruction, or a RAM.

Figure 19:
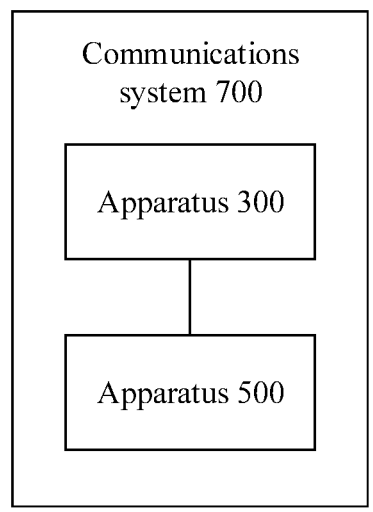
FIG. 19 is a schematic block diagram of a communications system according to an embodiment of this application.

FIG. 19 shows a communications system 700 according to an embodiment of this application. The communications system 700 includes the data transmission apparatus 300 in the embodiment shown in FIG. 15 and the data transmission apparatus 500 in the embodiment shown in FIG. 17.

An embodiment of this application further provides a computer storage medium. The computer storage medium may store a program instruction for executing any of the foregoing methods.

Optionally, the storage medium may be the memory 430 or the memory 630.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, the function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
receiving, from a first device, a physical layer protocol data unit (PPDU) occupying N 20 megahertz (MHz) channels having a total bandwidth of Nx20 MHz,
wherein the PPDU comprises a preamble sequence having a backward compatibility function and a first extremely high throughput long training field (EHT-LTF),
wherein the first EHT-LTF is in a first subcarrier set, wherein the first subcarrier set comprises one or more first subcarriers other than a second subcarrier that carries the preamble sequence and other than a direct current subcarrier in the N 20 MHz channels,
wherein a subcarrier in the N 20 MHz channels and subcarriers at two ends of the N 20 MHz channels are used to send the EHT-LTF, and
wherein N is a positive integer greater than or equal to two.

2. The method of claim 1, wherein the first subcarrier set further comprises one or more third subcarriers other than the second subcarrier and the direct current subcarrier in every two of the N 20 MHz channels.

3. The method of claim 1, wherein the PPDU further comprises an extremely high throughput signal (EHT-SIG) field located in a second time unit, wherein the preamble sequence comprises a legacy signal (L-SIG) field having the backward compatibility function and located in a first time unit, and wherein the first EHT-LTF is located in:
the first time unit;
the second time unit; or
a third time unit between the first time unit and the second time unit.

4. The method of claim 3, wherein the L-SIG field comprises a rate field indicating that a transmission rate of the PPDU is a first transmission rate, and wherein the method further comprises identifying, using the first transmission rate, a format of the PPDU.

5. The method of claim 3, wherein the PPDU comprises data carried on at least one resource unit, wherein the EHT-SIG field indicates either a first quantity of the at least one resource unit or a second quantity of remaining resource units in the at least one resource unit.

6. The method of claim 5, wherein the data comprises at least one physical layer service data unit (PSDU) carried on the at least one resource unit according to a predefined rule.

7. The method of claim 3, wherein the PPDU further comprises a redundant L-SIG (RL-SIG) field located in a fourth time unit, and wherein the third time unit sequentially immediately follows the first time unit.

8. The method of claim 1, wherein the PPDU further comprises an extremely high throughput short training field (EHT-STF) and a second EHT-LTF.

9. A device comprising:
a processor configured to generate a physical layer protocol data unit (PPDU) occupying N 20 megahertz (MHz) channels having a total bandwidth of N×20 MHz, wherein the PPDU comprises a preamble sequence having a backward compatibility function and an extremely high throughput long training field (EHT-LTF), wherein the EHT-LTF is in a first subcarrier set, wherein the first subcarrier set comprises one or more first subcarriers other than a second subcarrier that carries the preamble sequence and a direct current subcarrier in the N 20 MHz channels, wherein a subcarrier in the N 20 MHz channels and subcarriers at two ends of the N 20 MHz channels are used to send the EHT-LTF; and wherein N is a positive integer greater than or equal to two; and
a transceiver coupled to the processor and configured to send the PPDU to another device.

10. The device of claim 9, wherein the first subcarrier set further comprises one or more third subcarriers other than the second subcarrier and the direct current subcarrier in every two of the N 20 MHz channels.

11. The device of claim 9, wherein the PPDU further comprises an extremely high throughput signal (EHT-SIG) field located in a second time unit, wherein the preamble sequence comprises a legacy signal (L-SIG) field having the backward compatibility function and is located in a first time unit, and wherein the EHT-LTF is located in:
the first time unit;
the second time unit; or
a third time unit between the first time unit and the second time unit.

12. The device of claim 11, wherein the L-SIG field comprises a rate field indicating that a transmission rate of the PPDU is a first transmission rate, and wherein the first transmission rate enables another device to identify a format of the PPDU.

13. The device of claim 11, wherein the PPDU comprises data carried on at least one resource unit, and wherein the EHT-SIG field indicates either a first quantity of the at least one resource unit or a second quantity of remaining resource units in the at least one resource unit.

14. A device comprising:
a transceiver configured to receive, from another device, a physical layer protocol data unit (PPDU) occupying N 20 megahertz (MHz) channels having a total bandwidth of N×20 MHz, wherein the PPDU comprises a preamble sequence having a backward compatibility function and an extremely high throughput long training field (EHT-LTF), wherein the EHT-LTF is in a first subcarrier set, wherein the first subcarrier set comprises one or more first subcarriers other than a second subcarrier that carries the preamble sequence and a direct current subcarrier in the N 20 MHz channels, wherein a subcarrier in the N 20 MHz channels and subcarriers at two ends of the N 20 MHz channels are used to send the EHT-LTF, and wherein N is a positive integer greater than or equal to two; and
a processor coupled to the transceiver and configured to obtain the PPDU.

15. The device of claim 14, wherein the first subcarrier set further comprises one or more third subcarriers other than the second subcarrier and the direct current subcarrier in every two of the N 20 MHz channels.

16. The device of claim 14, wherein the PPDU further comprises an extremely high throughput signal (EHT-SIG) field located in a second time unit, wherein the preamble sequence comprises a legacy signal (L-SIG) field having the backward compatibility function and is located in a first time unit, and wherein the EHT-LTF is located in:
the first time unit;
the second time unit; or
a third time unit between the first time unit and the second time unit.

17. The device of claim 16, wherein the L-SIG field comprises a rate field indicating that a transmission rate of the PPDU is a first transmission rate, and wherein the processor is further configured to identify, using the first transmission rate, a format of the PPDU.

18. The device of claim 16, wherein the PPDU comprises data carried on at least one resource unit, and wherein the EHT-SIG field indicates either a first quantity of the at least one resource unit or a second quantity of remaining resource units in the at least one resource unit.

19. The device of claim 18, wherein the data comprises at least one physical layer service data unit (PSDU) carried on the at least one resource unit according to a predefined rule.

20. The device of claim 16, wherein the PPDU further comprises a redundant L-SIG (RL-SIG) field located in a fourth time unit, and wherein the fourth time unit sequentially immediately follows the first time unit.

* * * * *

UNITED STATES PATENT AND TRADEMARK OFFICE
CERTIFICATE OF CORRECTION

| | | |
|---|---|---|
| PATENT NO. | : 12,022,449 B2 | Page 1 of 1 |
| APPLICATION NO. | : 17/192121 | |
| DATED | : June 25, 2024 | |
| INVENTOR(S) | : Yanchun Li | |

It is certified that error appears in the above-identified patent and that said Letters Patent is hereby corrected as shown below:

In the Claims

Claim 9, Column 21, Line 38: "having-a total" should read "having a total"

Signed and Sealed this
Sixth Day of August, 2024

Katherine Kelly Vidal
*Director of the United States Patent and Trademark Office*